Nov. 28, 1944. G. F. RACKETT 2,363,689
PHOTOGRAPHIC PRINTING
Filed March 2, 1943
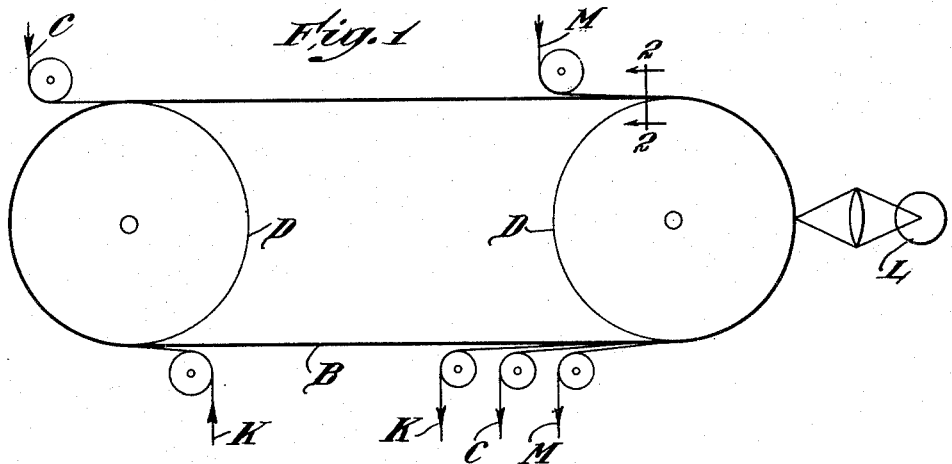
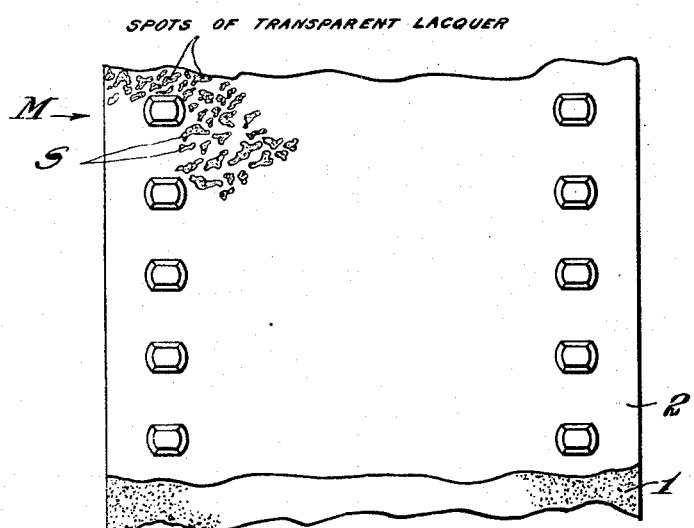
Inventor
Gerald F. Rackett
by Roberts, Cushman & Woodbury
att'ys.

Patented Nov. 28, 1944

2,363,689

UNITED STATES PATENT OFFICE 2,363,689

PHOTOGRAPHIC PRINTING

Gerald F. Rackett, Los Angeles, Calif., assignor to Technicolor Motion Picture Corporation, Hollywood, Calif., a corporation of Maine Application March 2, 1943, Serial No. 477,719

10 Claims. (Cl. 95—2)

In the art of cinematography it is sometimes desirable to print through the back of a film, that is through the support side, in contradistinction to the emulsion side hereinafter called the face of the film, with the back pressed against another film. In order to obtain uniform and clear printing it is necessary to press the films together at the printing aperture as is customary in contact printing; and when the back of one film is pressed against the back of another film, or indeed when any two smooth film surfaces are pressed tightly together, Newton rings are often recorded on the printed film in shadowy form.

In some cases it is desirable to print one film simultaneously from two other films with the three films pressed together in superposed contact, and sometimes two of the three films should be disposed back to back. In using a traveling matte or a masking film, for example, the film may be printed with light passing successively through the printing film and the matte or mask. Thus a film may be printed from a color-separation film with a color-correcting masking film in superposition with the other two films, so that the color deficiencies of the picture are corrected by the masking film in the process of printing the picture. Where three films are pressed together in a printing operation, there is of course more frequent occasion to present together the backs of two of the films or two surfaces which are sufficiently smooth to produce the aforesaid Newton rings; and in such cases it is also desirable to use higher pressure in pressing the films together in order to bring them as close together as possible for the printing operation.

Objects of the present invention are to provide a printing method which avoids the aforesaid difficulties, which allows the films to be pressed together with considerable pressure without printing the aforesaid rings, which is simple and economical, which affords better definition or greater apparent visibility, and which is generally superior to prior printing methods.

In one aspect the invention involves a method of printing films which comprises forming random irregularities on the back of one film, then pressing the back against one side of another film and finally passing light through one film and thence through said back into the other film. In printing from a color-separation film with the aid of a color-correcting masking film, for example, the irregularities may be formed on the back of the masking film and the three films may be superposed with these two films back to back and the color-separation film face to face with the film to be printed. Then, in the printing operation, light passes first through the color-correction film, then through the backs of the color-correction and the color-separation films and thence into the film to be printed.

While the aforesaid irregularities may be formed on the back of the color-separation film it usually is better to form them on the back of the masking film because the masking film can be replaced more easily and economically if it is damaged in the process. The irregularities may be formed on the film at any time, as for example at the time of manufacture or at the time of printing. While the irregularities may be formed by embossing or other suitable method, they are preferably formed by spraying minute spots of transparent lacquer in random distribution over the back of the film, the film being only partly covered with the spots and the lacquer being dried before the films are pressed together back to back. The spots, which are distributed at random, vary in size and some of them merge together to form larger spots of irregular size, and shape. Preferably the film is not sprayed until after it has been printed, developed and spliced. Then it is fed continuously past a spray gun and thence through a drying chamber.

In another aspect the invention involves printing a film from a color-separation film with a color-correction record superposed over the color-separation film on the side opposite the film to be printed. By thus separating the color-correction masking film from the film to be printed, the printed record has greater visibility, particularly in the high lights, because the mask has less and less effect the finer the detail owing to the fact that the printing light is not strictly parallel. Thus there is less decrease of contrast in the high lights than elsewhere, affording greater visibility in the high lights.

For the purpose of illustration a typical embodiment of the invention is shown in the accompanying drawing in which Fig. 1 is a diagrammatic view of a pin-belt printer suitable for use in practicing the new method;

Fig. 2 is a section on line 2—2 of Fig. 1; and

Fig. 3 is a view of the back of the film having irregularities as aforesaid, viewed from line 3—3 of Fig. 2, a part of the back being broken away to show the emulsion on the face side of the film.

As fully disclosed in Patents 2,257,254 and 2,271,572 the printing machine comprises a belt B having register pins P to fit into the sprocket holes of the films. The belt B is endless and travels over the drums D. The film to be printed is first fed to the belt and then the printing film or films are fed to the belt over the first film. In the illustration the film K to be printed is fed to the belt at a location immediately in advance of the left-hand drum, the color-separation film C is fed to the belt over the film K as the belt leaves the left-hand drum and the masking film M is fed to the belt in superposition to the other two films as the belt approaches the right-hand drum. By feeding the films to the belt at separate locations they seat on the belt more freely and with less danger of injury to the films. As the three belts pass around the right-hand drum, where printing is effected by a light source L, they are pressed into intimate contact with each other by the fanwise spreading of the pins on the belt as the belt is curved, and after leaving the drum the films are then fed from the belt to separate take-up reels.

The preferred arrangement of the films during the printing operation is shown in Fig. 2 where the film K is placed on the belt B with its back 6 against the belt and its face 5 directed away from the base, the color-separation film C is superposed over the film K with its back 3 uppermost and its face 4 in contact with the face 5 of film K, and the masking film M is superposed over the film C with its face 1 uppermost and its back 2 in contact with the back 3 of the film C. Thus the emulsion 1 of the masking film is separated from the emulsion 5 of the film to be printed by a distance equal to the thickness of the emulsion 4 of the film C and the supports of both films M and C. For best results in respect to the aforesaid visibility in the high lights, this distance should be in the neiphborhood of .012 inch for most subjects.

As indicated at S in Fig. 3 the aforesaid irregularities are preferably placed on the back of the masking film M. When forming these irregularities by the aforesaid spray method, the transparent lacquer may be deposited on the film by an ordinary atomizer such as used in spraying paint. The following is a suitable formula for the lacquer:

|  | Per cent |
|---|---|
| Nitrocellulose | 6.4 |
| Ester gum | 3.2 |
| Dibutyl phthalate | 3.2 |
| Butyl acetate | 25.7 |
| Butyl alcohol | 13.5 |
| Amyl acetate | 9 |
| Ethyl alcohol | 9 |
| Toluene | 30 |
| Total | 100 |

The spots of lacquer are deposited in random pattern and of course some of them merge together before drying. The best results have been secured by covering approximately 50% of the back of the film with lacquer.

It should be understood that the present disclosure is for the purpose of illustration only and that this invention includes all modifications and equivalents which fall within the scope of the appended claims.

I claim:

1. The method of making a corrected print from a color-separation record of a scene on one film which comprises forming a color-correcting record of the scene on the face of a masking film, and then printing a corrected record on another film with the three films in superposition, the color-separation film being intermediate the other two films in face-to-face contact with the printed film and back-to-back contact with the masking film.

2. The method of making a corrected print from a color-separation record of a scene on one film which comprises forming a color-correcting record of the scene on the face of a masking film, forming random irregularities on the back of one of said films, and then printing a corrected record on another film with the three films pressed together in superposition, the color-separation film being intermediate the other two films in back-to-back contact with the masking film.

3. The method of making a corrected print from a color-separation record of a scene on one film which comprises forming a color-correcting record of the scene on the face of a masking film, forming random irregularities on the back of one of said films, and then printing a corrected record on another film with the three films pressed together in superposition, the color-separation film being intermediate the other two films in face-to-face contact with the printed film and back-to-back contact with the masking film.

4. The method of making a corrected print from a color-separation record of a scene on one film which comprises forming a color-correcting record of the scene on the face of a masking film, depositing minute spots of transparent lacquer over the back of one of said films, and then printing a corrected record on another film with the three films pressed together in superposition, the color-separation film being intermediate the other two films in back-to-back contact with the masking film.

5. The method of making a corrected print from a color-separation record of a scene on one film which comprises forming a color-correcting record of the scene on the face of a masking film, depositing minute spots of transparent lacquer over the back of one of said films, and then printing a corrected record on another film with the three films pressed together in superposition, the color-separation film being intermediate the other two films in face-to-face contact with the printed film and back-to-back contact with the masking film.

6. The method of making a corrected print from a color-separation record of a scene on one film which comprises forming a color-correcting record of the scene on the face of a masking film, depositing minute spots of transparent lacquer over the back of the masking film and then printing a corrected record on another film with the three films pressed together in superposition, the color-separation film being intermediate the other two films in back-to-back contact with the masking film.

7. The method of making a corrected print from a color-separation record of a scene on one film which comprises forming a color-correcting record of the scene on the face of a masking film, depositing minute spots of transparent lacquer over the back of the masking film and then printing a corrected record on another film with the three films pressed together in superposition, the color-separation film being intermediate the other two films in face-to-face contact with the printed film and back-to-back contact with the masking film.

8. The method of making a corrected print from a color-separation record of a scene on one film which comprises forming a color-correcting record of the scene on the face of a masking film, forming random irregularities on the back of the masking film, and then printing a corrected record on another film with the three films pressed together in superposition, the color-separation film being intermediate the other two films in back-to-back contact with the masking film.

9. The method of making a corrected print from a color-separation record of a scene on one film which comprises forming a color-correcting record of the scene on the face of a masking film, forming random irregularities on the back of the masking film, and then printing a corrected record on another film with the three films pressed together in superposition, the color-separation film being intermediate the other two films in face-to-face contact with the printed film and back-to-back contact with the masking film.

10. The method of printing films which comprises depositing a discontinuous coating of minute spots of transparent lacquer solution in random locations on the back of one film, drying the spots, pressing said back against one side of another film, and then passing light through one film and thence through said back into the other film.

GERALD F. RACKETT.